(12) United States Patent  
Brenner (10) Patent No.: US 8,976,064 B2
(45) Date of Patent: Mar. 10, 2015

(54) SYSTEMS AND METHODS FOR SOLUTION SEPARATION FOR GROUND-AUGMENTED MULTI-CONSTELLATION TERMINAL AREA NAVIGATION AND PRECISION APPROACH GUIDANCE

(75) Inventor: Mats Anders Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 580 days.

(21) Appl. No.: 13/605,405

(22) Filed: Sep. 6, 2012

(65) Prior Publication Data

US 2014/0062765 A1 Mar. 6, 2014

(51) Int. Cl.
*G01S 19/20* (2010.01)
*G01S 19/41* (2010.01)
*G01S 19/07* (2010.01)

(52) U.S. Cl.
CPC *G01S 19/20* (2013.01); *G01S 19/07* (2013.01)
USPC .............................. 342/357.58; 342/357.24

(58) Field of Classification Search
CPC ................................ G01S 19/07; G01S 19/41
USPC ..................................................... 342/357.58
See application file for complete search history.

(56) References Cited

U.S. PATENT DOCUMENTS

| 5,760,737 | A | 6/1998 | Brenner |
| 5,786,773 | A | 7/1998 | Murphy |
| 6,515,618 | B1 | 2/2003 | Lupash |
| 6,522,266 | B1 | 2/2003 | Soehren et al. |
| 6,587,075 | B1 | 7/2003 | Loh et al. |
| 6,639,549 | B2 * | 10/2003 | Vanderwerf et al. ...... 342/357.58 |
| 6,760,663 | B2 | 7/2004 | Brenner |
| 6,856,905 | B2 | 2/2005 | Pasturel et al. |
| 6,944,541 | B2 | 9/2005 | Pasturel et al. |
| 6,985,812 | B2 | 1/2006 | Sweetapple |

(Continued)

OTHER PUBLICATIONS

European Patent Office, "Extended European Search Report including European Search Opinion from EP Application No. 13181918.7 mailed Dec. 9, 2013", "from Foreign Counterpart of U.S. Appl. No. 13/605,405", Dec. 9, 2013, pp. 1-7, Published in: EP.

(Continued)

*Primary Examiner* — Gregory C Issing
(74) *Attorney, Agent, or Firm* — Fogg & Powers LLC (57) ABSTRACT

A navigation system includes first receiver receiving satellite signals, second receiver receiving differential correction data from ground receivers, and processing device coupled to receivers. Processing device determines correction data for satellite signals based on differential correction; determines position solution based on satellite signals and corresponding differential correction data; determines first position sub-solutions based on satellite signals from all but one satellite (different for each first position sub-solution) and corresponding differential correction data; calculates first separations as function of first differences between position solution and first position sub-solutions; determines second position sub-solutions for mobile object based on satellite signals and corresponding differential correction data from all but one block of ground receivers (different for each second position sub-solution); calculates second separations as function of second differences between position solution and second position sub-solutions; detects error in position solution when one of first separations or second separations exceed corresponding separation limit.

20 Claims, 5 Drawing Sheets

(56) References Cited

U.S. PATENT DOCUMENTS

| | | | | |
|---|---|---|---|---|
| 7,219,013 | B1* | 5/2007 | Young et al. | 701/472 |
| 7,366,611 | B2 | 4/2008 | Sweetapple | |
| 7,512,492 | B2 | 3/2009 | Irvin et al. | |
| 7,554,487 | B2 | 6/2009 | Abraham et al. | |
| 7,609,204 | B2 | 10/2009 | May et al. | |
| 7,690,603 | B2 | 4/2010 | Peyrucain et al. | |
| 7,711,482 | B2 | 5/2010 | Coatantiec et al. | |
| 7,940,210 | B2 | 5/2011 | Fly et al. | |
| 8,014,948 | B2 | 9/2011 | Vanderwerf | |
| 8,019,539 | B2 | 9/2011 | Vanderwerf | |
| 8,082,099 | B2 | 12/2011 | Latif | |
| 8,106,823 | B2 | 1/2012 | Schroth | |
| 2001/0020214 | A1* | 9/2001 | Brenner | 701/213 |
| 2003/0117317 | A1 | 6/2003 | Vanderwerf | |
| 2004/0189518 | A1* | 9/2004 | Brenner | 342/358 |
| 2009/0146873 | A1 | 6/2009 | Vanderwerf | |
| 2009/0150074 | A1 | 6/2009 | Vanderwerf | |
| 2009/0322598 | A1 | 12/2009 | Fly et al. | |
| 2009/0326736 | A1 | 12/2009 | Waid | |
| 2012/0038512 | A1 | 2/2012 | Geswender et al. | |

OTHER PUBLICATIONS

European Patent Office, "Communication under Rule 71(3) from EP Application No. 13181918.7 mailed Jun. 10, 2014", "from Foreign Counterpart of U.S. Appl. No. 13/605,405", Jun. 10, 2014, pp. 1-63, Published in: EP.

Bhatti, "Improved Integrity Algorithms for Integrated GPS/INS Systems in the Presence of Slowly Growing Errors", "Thesis—Doctor of Philosophy", Mar. 2007, pp. 1-363, Publisher: University of London.

Bhatti et al., "Detecting Multiple Failures in GPS/INS Integrated System: A Novel Architecture for Integrity Monitoring", "Journal of Global Positioning Systems (2009)", 2009, pp. 26-42, vol. 8, No. 1, downloaded from: http://www.gnss.com.au/JoGPS/v8n1/finalized/JoGPS_v8n1p26-42.doc on Jul. 17, 2012.

Blanch et al., "A Simple Algorithm for Dual Frequency Ground Monitoring Compatible with ARAIM", "Proceedings of the 21st International Technical Meeting of the Satellite Division of The Institute of Navigation", Sep. 16, 2008, pp. 1-7.

Blanch et al., "A Proposal for Multi-Constellation Advanced RAIM for Vertical Guidance", "Proceedings of the 24th International Technical Meeting of the Satellite Division of The Institute of Navigation", Sep. 2010, pp. 1-16.

Brenner, Mats, "Integrated GPS/Intertial Fault Detection Availability", "Navigation: Journal of the Institute of Navigation", Mar. 1996, pp. 111-130, vol. 43, No. 2, Publisher: Institute of Navigation, Published in: US.

Brenner, Mats, "Integrated GPS LAAS/Inertial Guidance System Using Multiple Kalman Filters", "Proceedings of the 12th International Technical Meeting of the Satellite Division of the Institute of Navigation ION GPS 1999", Sep. 14, 1999, pp. 681-690, Publisher: Institute of Navigation, Published in: US.

Bruggemann, "Investigation of MEMS Inertial Sensors and Aircraft Dynamic Models in Global Positioning System Integrity Monitoring for Approaches with Vertical Guidance", 2009, pp. 1-205, downloaded from: http://eprints.qut.edu.au/32050/1/Troy_Bruggemann_Thesis.pdf on Jul. 17, 2012.

Escher et al, "GPS/IRS Hybridization: Definition of Exclusion Radius Using Solution Separation Method", Jun. 15, 2011, pp. 1-10.

"GNSS Evolutionary Architecture Study", "Phase I—Panel Report", Feb. 2008, Publisher: Federal Aviation Administration, Available at http://www.faa.gov/about/office_org/headquarters_offices/ato/service_units/techops/navservices/gnss/library/documents/media/GEAS_PhaseI_report_FINAL_15Feb08.pdf, pp. 1-53.

"Phase II of the GNSS Evolutionary Architecture Study", Feb. 2010, Publisher: Federal Aviation Administration, Available at: http://www.faa.gov/about/office_org/headquarters_offices/ato/service_units/techops/navservices/gnss/library/documents/media/GEASPhaseII_Final.pdf, pp. 1-122.

Greer et al., "Integrity Coasting Concept for General Aviation Users of the Ground Based Regional Augmentation System", "International Global Navigation Satellite Systems Society, IGNSS Symposium 2006" Jul. 2006, pp. 1-19.

Jiang et al., "A-RAIM vs. R-RAIM: A Comparative Study", "International Global Navigation Satellite Systems Society, IGNSS Symposium 2011", Nov. 2011, pp. 1-11.

Lee et al., "A Performance Analysis of a Tightly Coupled GPS/Inertial System for Two Integrity Monitoring Methods", "Navigation: Journal of the Institute of Navigation, vol. 47, No. 3", Oct. 2000, pp. 1-14.

* cited by examiner

SYSTEMS AND METHODS FOR SOLUTION SEPARATION FOR GROUND-AUGMENTED MULTI-CONSTELLATION TERMINAL AREA NAVIGATION AND PRECISION APPROACH GUIDANCE

BACKGROUND

Global Navigation Satellite Systems (GNSS), such as the Global Positioning System (GPS), estimate positions of vehicles based on signals from earth-orbiting satellite transmitters. For accuracy and reliability reasons, these systems have traditionally not been used for critical phases of aircraft navigation and guidance, such as aircraft landings. However, recent years have seen the development of ground-augmented GPS systems for use in automatic landing systems, such as a GNSS Landing System (GLS). These augmented systems rely on broadcast correction data to correct position estimates, or solutions, and thus provide more accurate position solutions.

SUMMARY

A navigation system for a mobile object includes a first receiver configured for reception of satellite signals from a plurality of satellites; a second receiver configured for reception of differential correction data from a plurality of blocks of ground receivers; at least one processing device communicatively coupled to the first receiver and the second receiver; wherein the at least one processing device is configured to determine correction data for each of the satellite signals from the plurality of satellites based on the differential correction data received through the second receiver from the plurality of blocks of ground receivers; wherein the at least one processing device is configured to determine a position solution for the mobile object based on the satellite signals received from the plurality of satellites and corresponding differential correction data received through the second receiver from the plurality of blocks of ground receivers; wherein the at least one processing device is configured to determine a plurality of first position sub-solutions for the mobile object based on satellite signals from all but one single satellite of the plurality of satellites, the one single satellite different for each of the plurality of first position sub-solutions, and corresponding differential correction data from the plurality of blocks of ground receivers; wherein the at least one processing device is configured to calculate first separations as a function of first differences between the position solution and the first position sub-solutions, the first separations providing first indications of any faults degrading the accuracy of the position solution; wherein the at least one processing device is configured to determine second position sub-solutions for the mobile object based on the satellite signals received from the plurality of satellites and corresponding differential correction data from all but one single block of ground receivers of the plurality of blocks of ground receivers, the single block of ground receivers different for each of the plurality of second position sub-solutions; wherein the at least one processing device is configured to calculate second separations as a function of second differences between the position solution and the second position sub-solutions, the second separations providing second indications of any faults degrading the accuracy of the position solution; and wherein the at least one processing device is configured to detect an error in the position solution when at least one of the first separations or the second separations exceed a corresponding separation limit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Figure 1:
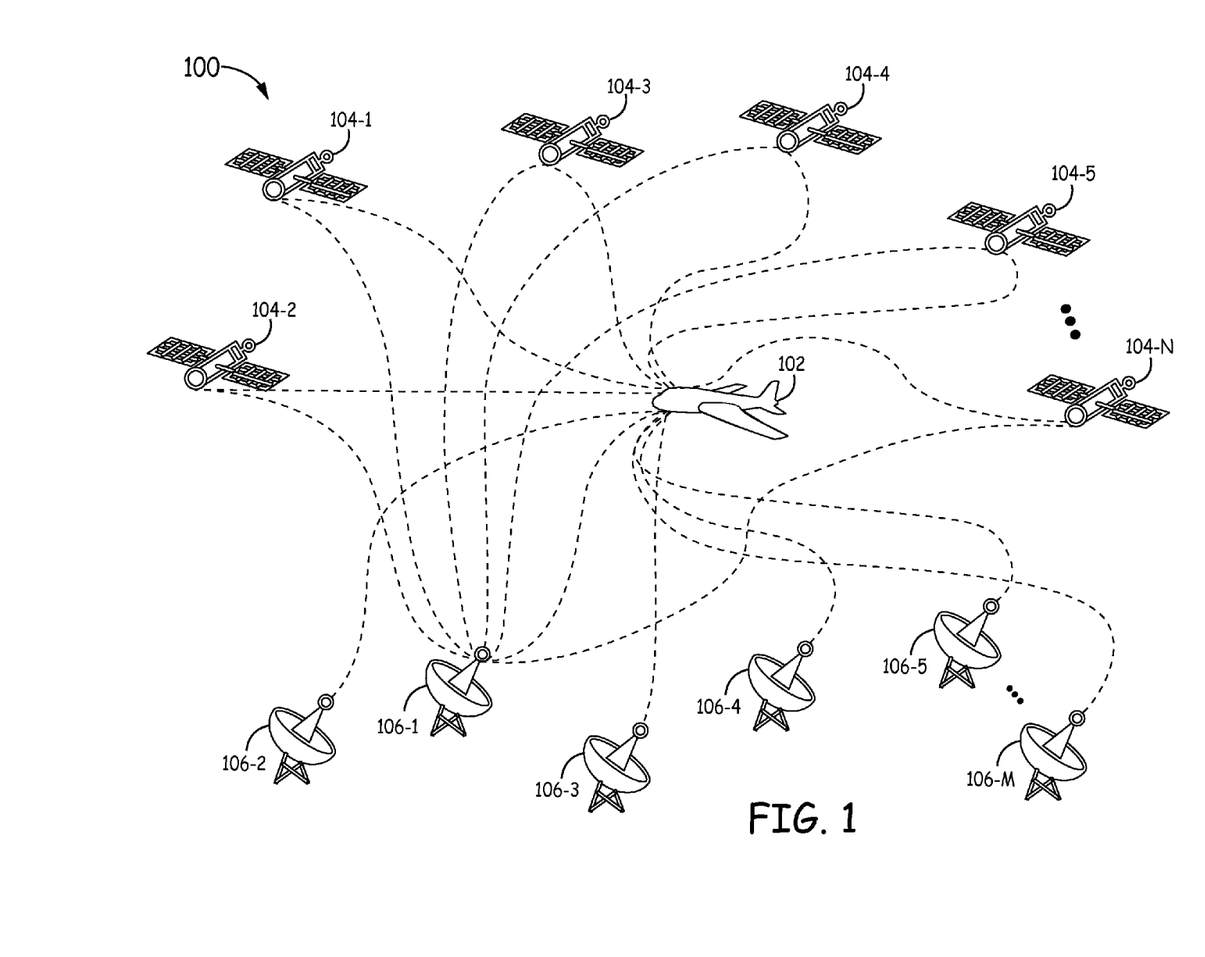
FIG. 1 is a general diagram depicting an exemplary embodiment of an aircraft implementing a navigation system for an aircraft according to the present disclosure.

FIG. 1 is a general diagram depicting an exemplary embodiment of a system 100 including an aircraft 102, a plurality of satellites in view 104-1 through 104-N and a plurality of ground receivers or blocks of ground receivers 106-1 through 106-M. In exemplary embodiments, 106-1 through 106-M represent blocks of ground receivers 106-1 through 106-M. A block of ground receivers includes at least one reference receiver (can contain a plurality of reference receivers). While this description often refers to blocks of ground receivers 106-1 through 106-M, it is understood that in other exemplary embodiments, some or all of the blocks of ground receivers 106-1 through 106-M include a single ground receiver. Aircraft 102 has antennas and receivers for receiving Global Navigation Satellite System (GNSS) signals from one or more constellations of navigation satellites 104-1 through 104-N and differential correction data from the plurality of blocks of ground receivers 106-1 through 106-M to implement Differential GNSS (DGNSS). In exemplary embodiments of DGNSS, the differential correction data is derived at each block of ground receivers 106 (including blocks of ground receiver 106-1 through 106-M) by receiving GNSS signals from the plurality of visible satellites 104-1 through 104-N and generating differential correction data for each of said satellites and for each block of ground receivers 106 based on the known position of the receiving block of ground receivers 106. In exemplary embodiments, each of the blocks of ground receivers 106-1 through 106-M receives GNSS signals at two frequencies from satellites 104-1 through 104-N and generates differential correction data for both frequencies or differential correction data that combines the two frequencies for each satellite 104 based on the known actual location of the block of ground receivers 106 and the GNSS measurements taken by the block of ground receivers 106. This differential correction data reflects any errors present in the GNSS measurements at the ground receivers in light of the a priori knowledge of the location of the block of ground receivers 106. Examples of civil DGNSS are the Ground Based Augmentation System (GBAS), the ground-based regional augmentation system (GRAS) and the satellite-based augmentation system (SBAS). An example of a military DGNSS is the Joint Precision Approach and Landing System (JPALS). Common for such systems, some of which have been standardized, is a broadcast (via a differential correction signal) of a set of messages. In GBAS this is a VHF broadcast and the GBAS messages are defined in RTCA DO-246. An example of differential correction data is the data in the GBAS type 1 message where each satellite is enumerated together with its data set. Examples of parameters in this data set are the constellation identifier (e.g. GPS), the signal type (e.g. L1 C/A), the reference time, the differential correction, the differential correction rate, the B-values and the range error sigma. In the GBAS standard, there is one differential correction per satellite signal but the B-values provides information that makes it possible to determine the individual differential corrections for all the ground receivers (in some embodiments, this is a maximum of 4) or blocks of receivers (in some embodiments, there is a maximum of 4 blocks). At the present time the civil multiple GNSS signal frequency standard for GBAS has not yet been developed. It is therefore possible that the differential data set for a satellite may include differential corrections that are combinations of corrections at different signal frequencies rather than including separate corrections for each frequency. An example of such a combination is the ionosphere delay free combination defined in the Interface Specification IS-GPS200.

In exemplary embodiments, all of the satellites 104-1 through 104-N are from the same GNSS satellite constellation, such as the United States' Global Positioning System (GPS), Russia's Global'naya Navigatsionnaya Sputnikovaya Sisterna (GLONASS), China's Beidou and Compass, the European Union's Galileo, France's Doppler Orbitography and Radio-positioning Integrated by Satellite (DORIS), India's Indian Regional Navigational Satellite System (IRNSS), and Japan's Quasi-Zenith Satellite System (QZSS). In other embodiments, satellites 104-1 through 104-N come from a plurality of different GNSS satellite constellations. In exemplary embodiments, satellites 104-1 through 104-N transmit using one or more transmission frequencies and aircraft 102 is capable of receiving the one or more transmission frequencies. In exemplary embodiments implementing GPS, L1 signals (operating around 1.57542 GHz) and/or L2 signals (operating around 1.2276 GHz) and/or L5 signals (operating around 1.17645) are implemented. In exemplary embodiments implementing GLONASS, SP signals at a first frequency (operating around 1.602 GHz) and/or SP signals at a second frequency (operating around 1.246) are implemented. In exemplary embodiments implementing COMPASS, B1 signals (operating around 1.561098 GHz), B1-2 signals (operating around 1.589742), B2 signals (operating around 1.20714 GHz) and/or B3 signals (operating around 1.26852 GHz) are implemented. In exemplary embodiments implementing Galileo, E5a and E5b signals (operating around 1.164-1.215 GHz), E6 signals (operating around 1.260-1.300 GHz), and/or E2-L1-E11 signals (operating around 1.559-1.592 GHz) are implemented.

Figure 2A:
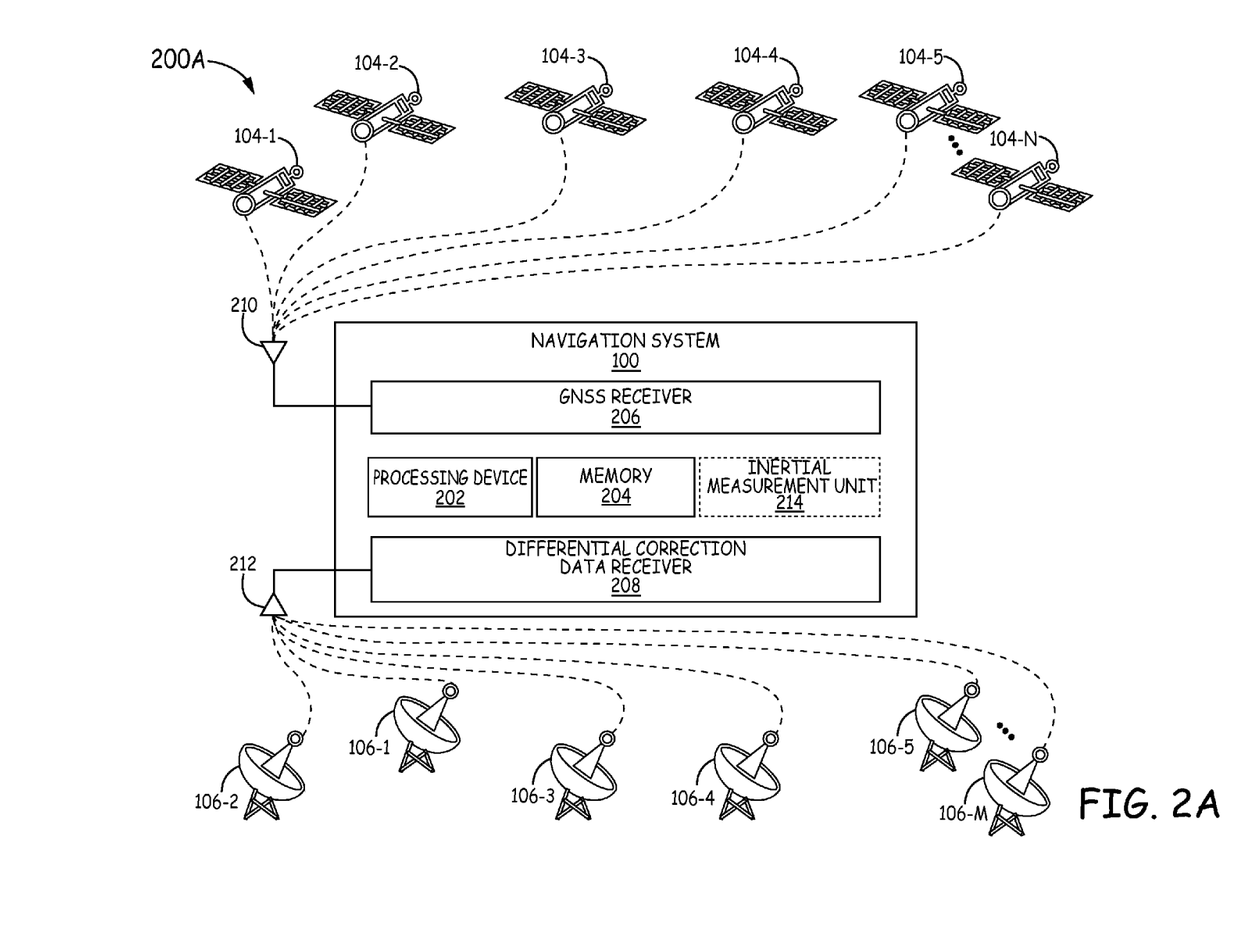
FIGS. 2A-2B are block diagrams depicting exemplary embodiments of navigation systems according to the present disclosure.
Figure 2B:
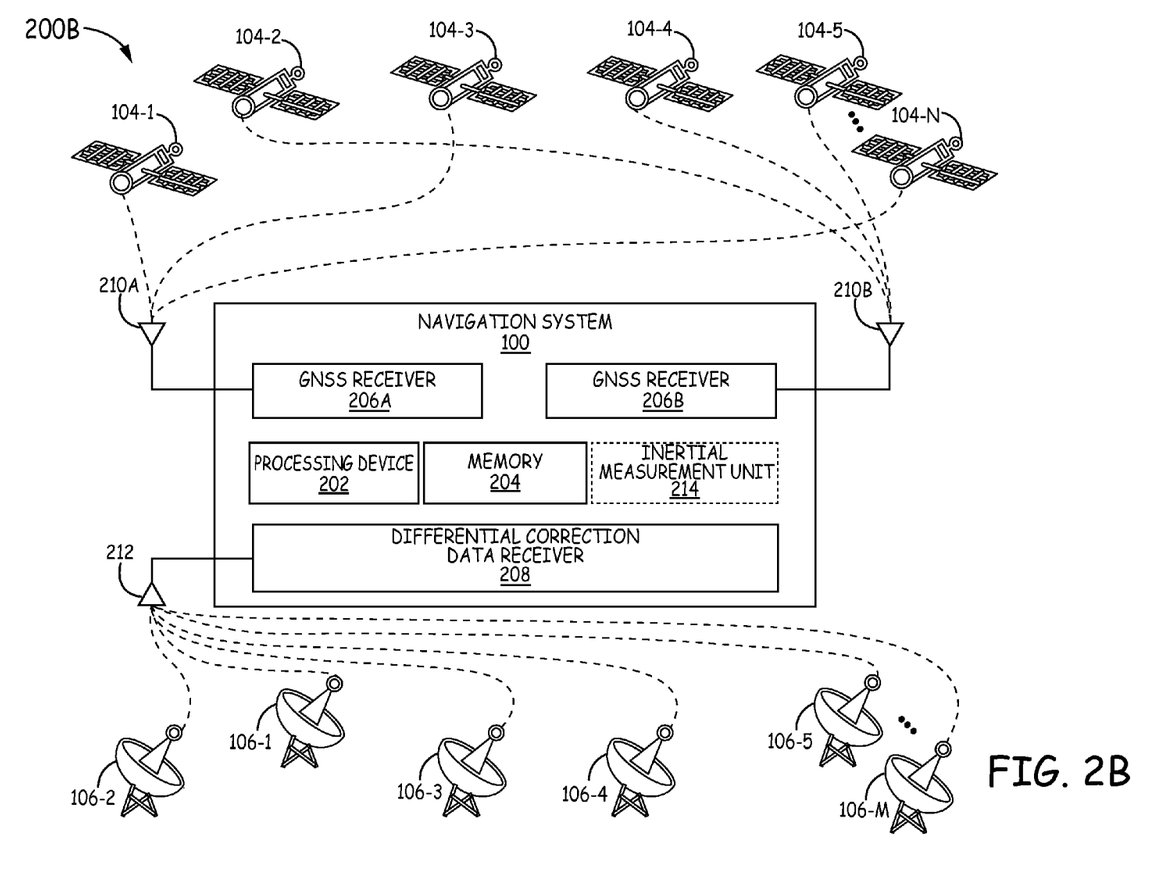

FIG. 2A-2B are block diagrams depicting exemplary embodiments of navigation systems 200 onboard aircraft 102. While navigation systems 200 are described as being onboard aircraft 102 (including jets, turboprops, and helicopters), in exemplary embodiments navigation systems 200 are onboard other vehicles, such as space vehicles, sea vessels, and ground vehicles, missiles, and rockets, or integrated into systems worn by individuals on the ground, in the air, on or in water, or in space. Each of FIGS. 2A-2B illustrates a different embodiment of navigation system 200, labeled 200A-200B respectively.

FIG. 2A is a block diagram depicting an exemplary embodiment of a navigation system 200A including a processing device 202, memory 204, a GNSS receiver 206, and a differential correction data receiver 208. In exemplary embodiments shown, processing device 202 is communicatively coupled to memory 204, GNSS receiver 206, and differential correction data receiver 208. In exemplary embodiments, processing device 202 implements solution-separation functionality as described below with reference to FIG. 3. In exemplary embodiments, memory 204 is used to store solution-separation functionality as described below with reference to FIG. 3.

In exemplary embodiments, GNSS receiver 206 receives GNSS signals through antenna 210 from satellites 104 from at least one GNSS satellite constellation, such as GPS, GLONASS, Beidou, Compass, Galileo, DORIS, IRNSS, QZSS, or any future GNSS satellite constellations. In exemplary embodiments, GNSS receiver 206 is implemented as a GNSS receiver function in an integrated system that includes an Inertial Measurement Unit (IMU). In exemplary implementations of system 200A, satellites 104-1 through 104-N are part of a single GNSS satellite constellation. In other exemplary implementations of system 200A, satellites 104-1 through 104-N are part of a plurality of GNSS satellite constellations, such that some of satellites 104-1 through 104-N are part of one GNSS satellite constellation and others of satellites 104-1 through 104-N are part of another GNSS satellite constellation.

In exemplary embodiments, differential correction data receiver 208 receives differential correction signals from at least one block of ground receivers 106, such as any of the blocks of ground receiver 106-1 through 106-M, through antenna 212. In exemplary embodiments, differential correction data receiver 208 is implemented as a differential correction data receiver function in an integrated system that includes an Inertial Measurement Unit (IMU). Each block of ground receivers 206 generates differential correction data based on its known position and GNSS signals received for the plurality of satellites 104-1 through 104-N. In exemplary implementations of system 200A where the GNSS receiver 206 receives GNSS signals from satellites 104 that are part of a single GNSS satellite constellation, the blocks of ground receivers 106 provide differential correction data via differential correction signals to the differential correction data receiver 208 for the valid satellites in view of the single GNSS satellite constellation. In exemplary implementations of system 200A where GNSS receiver 206 receives GNSS signals from satellites 104 that are part of a plurality of different GNSS satellite constellations, the ground receiver blocks 206 provide differential correction data via differential correction signals to the differential correction data receiver 208 for the valid satellites in view of the plurality of different GNSS satellite constellations. In exemplary implementations, differential correction signals are sent from a plurality of ground receiver blocks 206 to one ground receiver block 206 where they are aggregated and transmitted to the differential correction data receiver 208 as a single differential correction signal. In other implementations, the differential correction data receiver 208 receives a plurality of differential correction signals from a plurality of ground receiver blocks 206. In either case, differential correction data from a plurality of ground receiver blocks 206 is received at the differential correction data receiver 208.

In exemplary embodiments, processing device 202 receives GNSS signals from the GNSS receiver 206 and differential correction data from differential correction data receiver 208 to generate a position solution and position sub-solutions. As described in more detail below, the position solution is based on data received from all the available GNSS satellites 104 (that are valid and in view) and all of the available differential correction data received from all of the blocks of ground receivers 106. A first set of the position sub-solutions is based on data received from all but one of the available GNSS satellites 104 and all of the available differential correction data received from all of the blocks of ground receivers 106, where each of the first set of position sub-solutions excludes data received from a different one of the available GNSS satellites 104 (that are valid and in view). A second set of the position sub-solutions is based on data received from all of the available GNSS satellites 104 (that are valid and in view) and differential correction data from all but one of the blocks of ground receivers 106, where each of the second set of position sub-solutions excludes data received from a different one of the blocks of ground receivers 106.

The position solution and the position sub-solutions are defined by three independent parameters, such as, but not limited to, latitude, longitude, and altitude. In exemplary embodiments of navigation and guidance applications, position differences such as the position error verses a reference position are evaluated relative to a coordinate system. The coordinate system used for the differences may be of various types. In exemplary embodiments implementing GNSS, an earth-centered earth-fixed system may be used. In exemplary embodiments implementing inertial reference systems, the local geographic frame may be used. In exemplary guidance applications, a coordinate system reflecting the guidance objective may be used such as longitude, lateral, and vertical (or transverse) differences along the desired path. In exemplary embodiments, the position solution differences are vectors referenced to a coordinate system. Position differences in exemplary embodiments may be one dimensional, two dimensional, or three dimensional. An example of a one dimensional difference is a difference in the vertical or lateral direction relative to a reference path. An example of a two dimensional difference is the difference in the horizontal plane. An example of a three dimensional difference is the difference in an earth fixed earth centered frame.

The solution separation is a positive scalar measure of the difference of the form $\sqrt{\underline{v}^T Q \underline{v}}$ where $\underline{v}$ is the difference vector and Q is a positive definite matrix. For a one dimensional difference vector $\underline{v}=(v)$ the separation is the weighted absolute value of v i.e. the separation is $\sqrt{q}\ |v|$ (her Q is a positive scalar q), for a two dimensional vector $\underline{v}=(v_1, v_2)$ the separation is $\sqrt{v_1^2+v_2^2}\sqrt{\underline{e}^T Q \underline{e}}$ where $\underline{e}$ is a two dimensional direction dependent unit vector and for a three dimensional vector $\underline{v}=(v_1, v_2, v_3)$ the separation is $\sqrt{v_1^2+v_2^2+v_3^2}\sqrt{\underline{e}^T Q \underline{e}}$ where $\underline{e}$ is a three dimensional direction dependent unit vector. In exemplary embodiments, processing device 202 calculates solutions separations for the position solution and each of the position sub-solutions in the first and second set of position sub-solutions.

In exemplary embodiments, the solution separation is compared to a separation limit which acts as a threshold that may change in value depending on for instance signal power and satellite geometry relative to the mobile object. For each separation, the separation limit is determined such that the probability of a false detection stays below an allocated value (sub allocation). The overall probability of false detection per unit of time can be maintained at the required level by making sure all sub allocations taken together, considering possible correlations, do not exceed the required level.

The number of special satellite fault modes referred to as ranging source faults in the Ground Based Augmentation System (GBAS) standard although still rare are expected to increase in systems integrating multiple GNSS satellite constellations with complex signal structures. Special satellite faults typically induce spatial error gradients in the satellite signals as seen from the navigation system 100 and the ground stations 106. By implementing solution separation simultaneously covering both the satellite signal and the differential correction data faults, exemplary embodiments can minimize the impact of these special satellite faults without further increasing the complexity of the system by requiring additional monitors in ground stations and aircrafts designed to cover all the possible fault modes. This allows for simplified ground station and aircraft implementations with minimized monitoring requirements.

In exemplary embodiment, optional inertial measurement unit 214 is also included in system 200A. Optional inertial measurement unit 214 is communicatively coupled to processing device 202. In exemplary implementations having optional inertial measurement unit 214, processing device 202 also performs GNSS and IMU fusion functionality as part of the solution separation functionality described herein. Earlier systems and methods using GNSS cannot adequately cope with radio frequency interference (RFI) and anomalous ionospheric activity (such as ionosphere scintillation). RF interference occurs when there is a source of RF noise that interferes with the GNSS satellite signals received either at the navigation system 100 or the ground receivers 106 or the correction signal received at the navigation system 100. Ionosphere scintillation occurs when there are changes in the ionosphere that cause instabilities in the signal propagation medium resulting in erratic behavior of the GNSS signals.

In exemplary embodiments, GNSS and IMU fusion help to reduce the effect of radio frequency interference (RFI) and ionosphere scintillation. In exemplary embodiments, GNSS receiver 208 is configured to receive GNSS signals on two different frequencies, helping to mitigate the impact of ionosphere delay anomalies and potentially also the effect of the ionosphere scintillation. Specifically, the ionospheric delay can be removed, which strongly mitigates the impact of the ionospheric anomaly. Even with this mitigation, the ionospheric scintillation in some regions of the world and the RFI may still cause landing to be interrupted. Exemplary embodiments including an inertial measurement unit (IMU) provides signals to the integrated solution that can bridge the gap caused by the interruption.

The use of multiple GNSS dual frequency constellation signals in combination with inertial support vastly improves overall performance, but the use of more signals also increases the number of fault modes in the system. In exemplary embodiments using DGNSS and implementing solution separation covering both the satellite signal faults and the differential correction data faults, the systems and methods described herein can reduce the effect of radio frequency interference (RFI) and ionosphere scintillation while also keeping the fault modes in the system in check. By implementing solution separation covering both the satellite signal faults and the differential correction data faults, we can better compensate for the additional special fault modes (such as ranging source faults) that are added when additional constellations are added. The solution separation applied to the differential correction data helps to ensure that faults in the ground receivers are accounted for in an optimal way. By simultaneously applying solution separation to the satellite signals that have been differentially corrected, the special fault modes (which are rare) are also accounted for in an optimal way, thus minimizing complexity by avoiding additional special purpose monitors.

FIG. 2B is a block diagram depicting an exemplary embodiment of a navigation system 200B including processing device 202, memory 204, a first GNSS receiver 206A, a second GNSS receiver 206B, and differential correction data receiver 208. System 200B includes similar components to system 200A and operates according to similar principles and methods as system 200A described above. The difference between system 200B and system 200A is that system 200B includes first GNSS receiver 206A coupled to a first antenna 210A and second GNSS receiver 206B coupled to a second antenna 210B instead of single GNSS receiver 206. In exemplary embodiments, first GNSS receiver 206A receives signals from satellites 104 that are part of a first GNSS satellite constellation (including satellite 104-1, satellite 104-3, and satellite 104-N). In exemplary embodiments, first GNSS receiver 206B receives signals from satellites 104 that are part of a second GNSS satellite constellation (including satellite 104-2, satellite 104-4, and satellite 104-5). While system 200B only shows two GNSS receivers 206 (first GNSS receiver 206A and second GNSS receiver 206B), it is understood that greater quantities of GNSS receivers 206 can be included as well. In exemplary embodiments, the two or more separate GNSS receivers 206 are coupled to the single antenna 210 through a power splitter. In other embodiments, the two or more separate GNSS receivers 206 are each individually coupled to a plurality of antennas 210.

In exemplary embodiments, two separate differential correction data receivers 208 are included instead of a single differential correction data receiver 208. In other embodiments, it is understood that greater quantities of differential correction data receivers 208 can be included. In exemplary embodiments, the two or more separate differential correction data receivers 208 are coupled to the single antenna 212 through a power splitter. In other embodiments, the two or more separate differential correction data receivers 208 are each individually coupled to a plurality of antennas 212.

In exemplary embodiments, processing device 202 implements solution-separation functionality as described below with reference to FIG. 3. In exemplary embodiments, memory 204 is used to store solution-separation functionality as described below with reference to FIG. 3.

Figure 3:
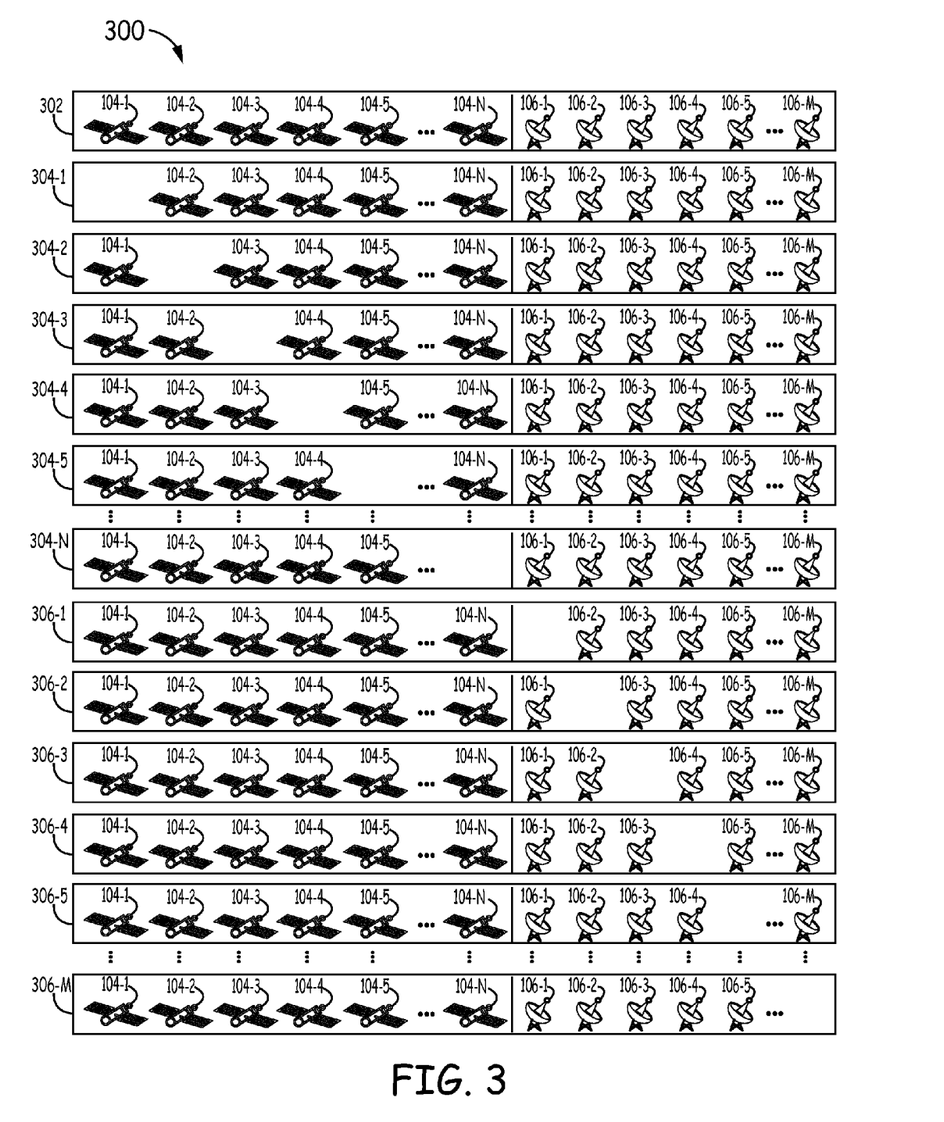
FIG. 3 is a block diagrams depicting exemplary embodiments of data sets used in a position solution and a plurality of position sub-solutions.

FIG. 3 is a block diagram depicting an exemplary embodiment of data set 300 including a position solution 302, a first plurality of position sub-solutions 304-1 through 304-N, and a second plurality of position sub-solutions 306-1 through 306-M. Position solution 302 includes data from each of the plurality of satellite signals received through the at least one GNSS receiver 206, including satellites 104-1 through 104-N. Position solution 302 also includes correction data derived from the differential correction signal received from the ground receivers 106-1 through 106-M through the at least one differential correction data receiver 208. Thus, the position solution 302 includes all the information currently available from the master set of satellites 104-1 through 104-N and all the information currently available from all the ground receivers 106. In exemplary embodiments, the plurality of satellite signals in this master set is dynamic and will change as the satellites and/or the aircraft 102 (or other vehicle or object) move or other objects obscure the signals from one satellite or another. In exemplary embodiments, the plurality of ground receivers 106 providing differential corrections is dynamic and could change as the satellites and/or aircraft 102 (or other vehicle or object) move or other objects obscure the signals between the ground stations 106 and satellites 104.

Each of position sub-solutions 304-1 through 304-N filter-out (or exclude) data from a different one of the satellites 104-1 through 104-N of the master set of satellites. Thus, each of the plurality of position sub-solutions 304-1 through 304-N is calculated without regard to satellite signals from a different one of the plurality of satellite signals from satellites 104-1 through 104-N and corresponding correction data. In exemplary embodiments, the processing device 202 is configured to calculate first differences between the main position solution 302 and each of the position sub-solutions 304-1 through 304-N. In exemplary embodiments, the processing device 202 is further configured to calculate first separations as a function of the first differences. In exemplary embodiments, the first separations providing first indications of a fault degrading the accuracy of the main position solution 302.

Each of position sub-solutions 306-1 through 306-M filter-out (or exclude) differential correction data from a different block of ground receivers 106 of the blocks of ground receivers 106-1 through 106-M. Thus, each of the plurality of position sub-solutions 306-1 through 306-M is calculated without regard to correction data based on a different block of the plurality of blocks of ground receivers 106. In exemplary embodiments, the processing device 202 is configured to calculate second differences between the main position solution 302 and each of the position sub-solutions 306-1 through 306-M. In exemplary embodiments, the processing device 202 is further configured to calculate second separations as a function of the second differences. In exemplary embodiments, the second separations providing second indications of a fault degrading the accuracy of the main position solution 302.

In exemplary embodiments, the processing device 202 is configured to detect an error in the position solution when at least one of the first separations or the second separations exceed a corresponding separation limit. In exemplary embodiments, each of the first separations and the second separations have individual separation limits tailored to each separation based on any of the following: the received signal power at the navigation system 100, the elevation and azimuth of satellites 104 at the navigation system 100, the signal power at the ground stations 106, the elevation and azimuth of satellites 104 at the ground stations 106, the distance of ground stations 106 from the navigation system 100, and the elevation and azimuth of the navigation system 100 from the ground stations 106.

Figure 4:
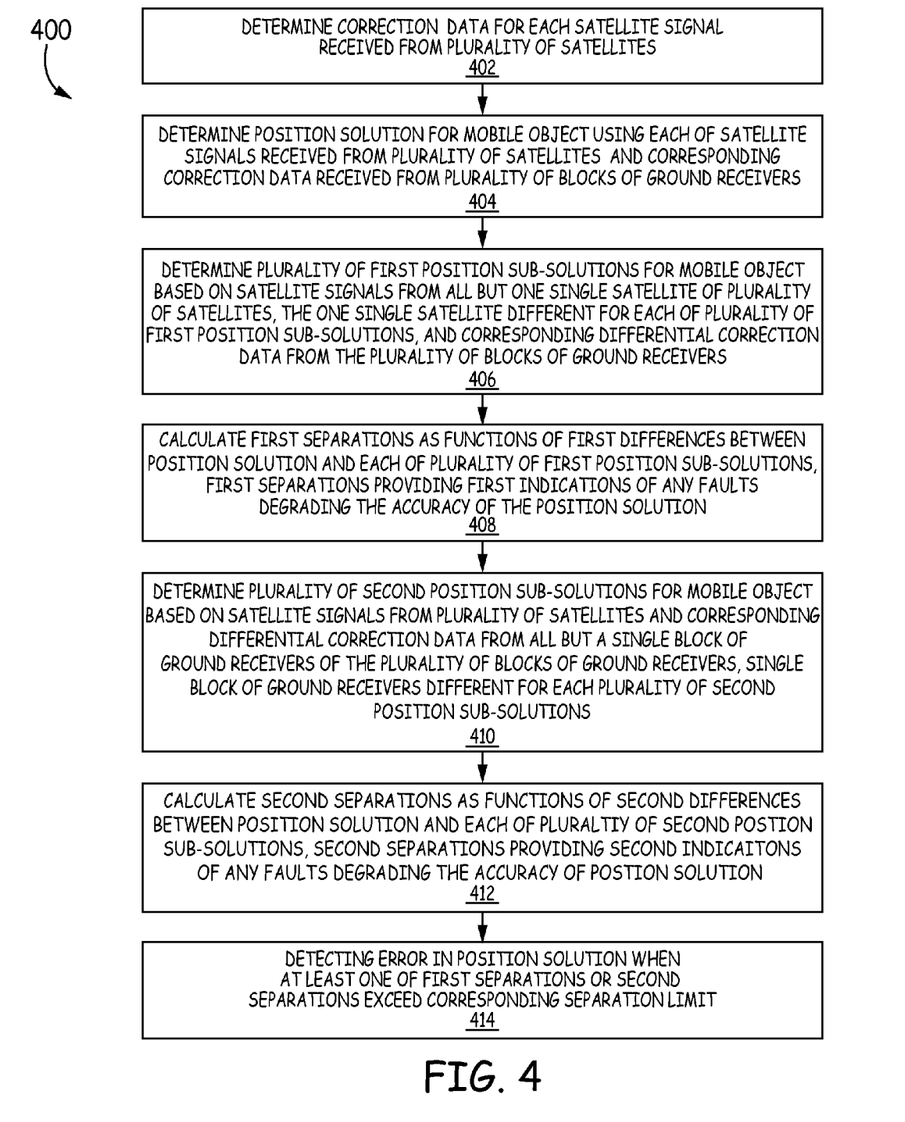
FIG. 4 is a flow diagram depicting an exemplary embodiment of a method according to the present disclosure.

FIG. 4 shows flow diagram depicting an exemplary method 400 according to the present disclosure. Exemplary method 400 begins at block 402 with determining correction data for each satellite signals received from a plurality of satellites. In exemplary embodiments, the correction data is based on a differential correction signal for a plurality of ground receivers and received from at least one ground receiver. Exemplary method 400 proceeds to block 404 with determining a position solution for a mobile object using each of the satellite signals received from the plurality of satellites and corresponding correction data received from a plurality of blocks of ground receivers. In exemplary implementations of method 400, the mobile object is an aircraft.

Exemplary method 400 proceeds to block 406 with determining a plurality of first position sub-solutions for the mobile object based on satellite signals from all but one single satellite of the plurality of received satellites and corresponding differential correction data from the plurality of blocks of ground receivers. The one single satellite is different for each of the plurality of first position sub-solutions. Exemplary method 400 proceeds to block 408 with calculating first separations as functions of first differences between the position solution and each of the plurality of first position sub-solutions. The first separations provide first indications of any faults degrading the accuracy of the position solution.

Exemplary method 400 proceeds to block 410 with determining a plurality of second position sub-solutions for the mobile object based on satellite signals from the plurality of satellites and corresponding differential correction data from all but one single block of ground receivers of the plurality of blocks of ground receivers. The single block of ground receivers is different for each of the plurality of second position sub-solutions. Exemplary method 400 proceeds to block 412 with calculating second separations as functions of second differences between the position solution and each of the plurality of second position sub-solutions. The second separations provide second indications of any faults degrading the accuracy of the position solution.

Exemplary method 400 proceeds to block 414 with detecting an error in the position solution when at least one of the first separations or the second separations exceed a corresponding separation limit. In exemplary implementations, detection of the error in the position solution occurs when at least one of the first separations exceeds a first separation limit corresponding to the first separations. In exemplary implementations, detection of the error in the position solution occurs when at least one of the second separations exceeds a second separation limit corresponding to the second separations.

In exemplary implementations, detection of an error exceeding a certain detection threshold causes an alert to an operator of the vehicle implementing the navigation system 100. In exemplary implementations, detection of an error exceeding a certain detection threshold causes an automatic guidance system, such as an auto-pilot function implemented as part of a GNSS landing system (GLS), to abort an automated landing approach to a runway. In exemplary implementations, the system can attempt another approach, a pilot/operator can manually land the aircraft, etc.

As used in this description, a processing device or unit (such as, but not limited to, processing device 202 described above and shown in the FIGS. 2A-2B) includes or functions with software programs, firmware or other computer readable instructions for carrying out various methods, process tasks, calculations, and control functions, used in the navigation system 200. These instructions are typically stored on any appropriate computer readable medium (such as, but not limited to, memory 204) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a navigation system for a mobile object, comprising: a first receiver configured for reception of satellite signals from a plurality of satellites; a second receiver configured for reception of differential correction data from a plurality of blocks of ground receivers; at least one processing device communicatively coupled to the first receiver and the second receiver; wherein the at least one processing device is configured to determine correction data for each of the satellite signals from the plurality of satellites based on the differential correction data received through the second receiver from the plurality of blocks of ground receivers; wherein the at least one processing device is configured to determine a position solution for the mobile object based on the satellite signals received from the plurality of satellites and corresponding differential correction data received through the second receiver from the plurality of blocks of ground receivers; wherein the at least one processing device is configured to determine a plurality of first position sub-solutions for the mobile object based on satellite signals from all but one single satellite of the plurality of satellites, the one single satellite different for each of the plurality of first position sub-solutions, and corresponding differential correction data from the plurality of blocks of ground receivers; wherein the at least one processing device is configured to calculate first separations as a function of first differences between the position solution and the first position sub-solutions, the first separations providing first indications of any faults degrading the accuracy of the position solution; wherein the at least one processing device is configured to determine second position sub-solutions for the mobile object based on the satellite signals received from the plurality of satellites and corresponding differential correction data from all but one single block of ground receivers of the plurality of blocks of ground receivers, the single block of ground receivers different for each of the plurality of second position sub-solutions; wherein the at least one processing device is configured to calculate second separations as a function of second differences between the position solution and the second position sub-solutions, the second separations providing second indications of any faults degrading the accuracy of the position solution; and wherein the at least one processing device is configured to detect an error in the position solution when at least one of the first separations or the second separations exceed a corresponding separation limit.

Example 2 includes the navigation system of Example 1, further comprising an inertial measurement unit communicatively coupled to the at least one processing unit; wherein the inertial measurement unit is configured to measure inertial motion of the mobile object and supply inertial measurement data based on the measured inertial motion to the at least one processing unit; and wherein the at least one processing unit is further configured to augment at least one of the position solution, the first position sub-solutions, and the second position sub-solutions based on the inertial measurement data received from the inertial measurement unit.

Example 3 includes the navigation system of any of Examples 1-2, wherein a first subset of the plurality of satellites belong to a first global navigation satellite system constellation; wherein a second subset of the plurality of satellites belong to a second global navigation satellite system constellation; and wherein the satellite signals received by the first receiver are from both the first subset and the second subset of the plurality of satellites.

Example 4 includes the navigation system of any of Examples 1-3, wherein at least one block of ground receivers of the plurality of blocks of ground receivers includes only one ground receiver.

Example 5 includes the navigation system of any of Examples 1-3, wherein at least one block of ground receivers of the plurality of block of ground receivers includes a plurality of ground receivers.

Example 6 includes the navigation system of any of Examples 1-5, wherein corresponding separation limits corresponding to at least two of the first separations and the second separations are different.

Example 7 includes the navigation system of any of Examples 1-6, wherein the mobile object is a vehicle.

Example 8 includes the navigation system of any of Examples 1-6, wherein the mobile object is an aircraft.

Example 9 includes a method comprising: determining correction data for each satellite signal received from a plurality of satellites, the correction data based on differential correction data received from a plurality of blocks of ground receivers; determining a position solution for a mobile object using each of the satellite signals received from the plurality of satellites and corresponding differential correction data from the plurality of blocks of ground receivers; determining a plurality of first position sub-solutions for the mobile object based on satellite signals from all but one single satellite of the plurality of satellites, the one single satellite different for each of the plurality of first position sub-solutions, and corresponding differential correction data from the plurality of blocks of ground receivers; calculating first separations as functions of first differences between the position solution and each of the plurality of first position sub-solutions, the first separations providing first indications of any faults degrading the accuracy of the position solution; determining a plurality of second position sub-solutions for the mobile object based on satellite signals from the plurality of satellites and corresponding differential correction data from all but one single block of ground receivers of the plurality of blocks of ground receivers, the single block of ground receivers different for each of the plurality of second position sub-solutions; calculating second separations as functions of second differences between the position solution and each of the plurality of second position sub-solutions, the second separations providing second indications of any faults degrading the accuracy of the position solution; and detecting an error in the position solution when at least one of the first separations or the second separations exceed a corresponding separation limit.

Example 10 includes the method of Example 9, further comprising augmenting at least one of the position solution, the first position sub-solution, and the second position sub-solution based on the inertial measurement data received from an inertial measurement unit measuring inertial motion of the mobile object.

Example 11 includes the method of any of Examples 9-10, wherein a first subset of the plurality of satellites belong to a first global navigation satellite system constellation; wherein a second subset of the plurality of satellites belong to a second global navigation satellite system constellation; and wherein the satellite signals received from the plurality of satellites are from both the first subset and the second subset of the plurality of satellites.

Example 12 includes the method of any of Examples 9-11, wherein at least one block of ground receivers of the plurality of blocks of ground receivers includes only one ground receiver.

Example 13 includes the method of any of Examples 9-12, wherein corresponding separation limits corresponding to at least two of the first separations and the second separations are different.

Example 14 includes the method of any of Examples 9-13, wherein the mobile object is an aircraft.

Example 15 includes a navigation system, comprising: a first receiver configured for reception of a plurality of satellite signals; a second receiver configured for reception of differential correction data for a plurality of blocks of stationary receivers that are also receiving the plurality of satellite signals; at least one processing device communicatively coupled to the first receiver and the second receiver; wherein the at least one processing device is configured to determine correction data for each of the plurality of satellite signals based on the differential correction data received through the second receiver from the plurality of blocks of stationary receivers; wherein the at least one processing device is configured to determine a position solution for the vehicle using each of the plurality of satellite signals received through the first receiver and corresponding correction data received through the second receiver from the plurality of blocks of stationary receivers; wherein the at least one processing device is configured to determine a first plurality of position sub-solutions for the navigation system using a first plurality of subsets of the plurality of satellite signals and corresponding correction data, wherein each of the first plurality of subsets of the plurality of satellite signals includes signals from all but one single satellite, the one single satellite different for each of the first plurality of subsets of the plurality of satellite signals; wherein the at least one processing device is configured to calculate first separations as a function of first differences between the position solution and the first plurality of position sub-solutions, the first separations providing first indications of any faults degrading the accuracy of the position solution; wherein the at least one processing device is configured to determine a second plurality of position sub-solutions for the navigation system using each of the plurality of satellite signals and corresponding correction data received from a second plurality of subsets of the plurality of blocks of stationary receivers, wherein each of the second plurality of subsets of the plurality of blocks of stationary receivers includes all but one block of stationary receivers, the one block of stationary receivers excluded being different for each of the second plurality of subsets of the plurality of blocks of stationary receivers; wherein the at least one processing device is configured to calculate second separations as a function of second differences between the position solution and the second plurality of position sub-solutions, the second separations providing second indications of any faults degrading the accuracy of the position solution; and wherein the at least one processing device is configured to detect an error in the position solution when at least one of the first separations or the second separations exceed a corresponding separation limit.

Example 16 includes the navigation system of Example 15, further comprising an inertial measurement unit communicatively coupled to the at least one processing unit; wherein the inertial measurement unit is configured to measure inertial motion of the mobile object and supply inertial measurement data based on the measured inertial motion to the at least one processing unit; and wherein the at least one processing unit is further configured to augment at least one of the position solution, the first position sub-solutions, and the second position sub-solutions based on the inertial measurement data received from the inertial measurement unit.

Example 17 includes the navigation system of any of Examples 15-16, wherein a first subset of the plurality of satellites belong to a first global navigation satellite system constellation; wherein a second subset of the plurality of satellites belong to a second global navigation satellite system constellation; and wherein the satellite signals received by the first receiver are from both the first subset and the second subset of the plurality of satellites.

Example 18 includes the navigation system of any of Examples 15-17, wherein at least one block of ground receivers of the plurality of blocks of ground receivers includes only one ground receiver.

Example 19 includes the navigation system of any of Examples 15-18, wherein corresponding separation limits corresponding to at least two of the first separations and the second separations are different.

Example 20 includes the navigation system of any of Examples 15-19, wherein the mobile object is an aircraft.

What is claimed is:

1. A navigation system for a mobile object, comprising:
    a first receiver configured for reception of satellite signals from a plurality of satellites;
    a second receiver configured for reception of differential correction data from a plurality of blocks of ground receivers;
    at least one processing device communicatively coupled to the first receiver and the second receiver;
    wherein the at least one processing device is configured to determine correction data for each of the satellite signals from the plurality of satellites based on the differential correction data received through the second receiver from the plurality of blocks of ground receivers;
    wherein the at least one processing device is configured to determine a position solution for the mobile object based on the satellite signals received from the plurality of satellites and corresponding differential correction data received through the second receiver from the plurality of blocks of ground receivers;
    wherein the at least one processing device is configured to determine a plurality of first position sub-solutions for the mobile object based on satellite signals from all but one single satellite of the plurality of satellites, the one single satellite different for each of the plurality of first position sub-solutions, and corresponding differential correction data from the plurality of blocks of ground receivers;
    wherein the at least one processing device is configured to calculate first separations as a function of first differences between the position solution and the first position sub-solutions, the first separations providing first indications of any faults degrading the accuracy of the position solution;
    wherein the at least one processing device is configured to determine second position sub-solutions for the mobile object based on the satellite signals received from the plurality of satellites and corresponding differential correction data from all but one single block of ground receivers of the plurality of blocks of ground receivers, the single block of ground receivers different for each of the plurality of second position sub-solutions;
    wherein the at least one processing device is configured to calculate second separations as a function of second differences between the position solution and the second position sub-solutions, the second separations providing second indications of any faults degrading the accuracy of the position solution; and
    wherein the at least one processing device is configured to detect an error in the position solution when at least one of the first separations or the second separations exceed a corresponding separation limit.

2. The navigation system of claim 1, further comprising an inertial measurement unit communicatively coupled to the at least one processing unit;
    wherein the inertial measurement unit is configured to measure inertial motion of the mobile object and supply inertial measurement data based on the measured inertial motion to the at least one processing unit; and
    wherein the at least one processing unit is further configured to augment at least one of the position solution, the first position sub-solutions, and the second position sub-solutions based on the inertial measurement data received from the inertial measurement unit.

3. The navigation system of claim 1, wherein a first subset of the plurality of satellites belong to a first global navigation satellite system constellation;
    wherein a second subset of the plurality of satellites belong to a second global navigation satellite system constellation; and
    wherein the satellite signals received by the first receiver are from both the first subset and the second subset of the plurality of satellites.

4. The navigation system of claim 1, wherein at least one block of ground receivers of the plurality of blocks of ground receivers includes only one ground receiver.

5. The navigation system of claim 1, wherein at least one block of ground receivers of the plurality of block of ground receivers includes a plurality of ground receivers.

6. The navigation system of claim 1, wherein corresponding separation limits corresponding to at least two of the first separations and the second separations are different.

7. The navigation system of claim 1, wherein the mobile object is a vehicle.

8. The navigation system of claim 1, wherein the mobile object is an aircraft.

9. A method comprising:
    determining correction data for each satellite signal received from a plurality of satellites, the correction data based on differential correction data received from a plurality of blocks of ground receivers;
    determining a position solution for a mobile object using each of the satellite signals received from the plurality of satellites and corresponding differential correction data from the plurality of blocks of ground receivers;
    determining a plurality of first position sub-solutions for the mobile object based on satellite signals from all but one single satellite of the plurality of satellites, the one single satellite different for each of the plurality of first position sub-solutions, and corresponding differential correction data from the plurality of blocks of ground receivers;

calculating first separations as functions of first differences between the position solution and each of the plurality of first position sub-solutions, the first separations providing first indications of any faults degrading the accuracy of the position solution;

determining a plurality of second position sub-solutions for the mobile object based on satellite signals from the plurality of satellites and corresponding differential correction data from all but one single block of ground receivers of the plurality of blocks of ground receivers, the single block of ground receivers different for each of the plurality of second position sub-solutions;

calculating second separations as functions of second differences between the position solution and each of the plurality of second position sub-solutions, the second separations providing second indications of any faults degrading the accuracy of the position solution; and detecting an error in the position solution when at least one of the first separations or the second separations exceed a corresponding separation limit.

10. The method of claim 9, further comprising augmenting at least one of the position solution, the first position sub-solution, and the second position sub-solution based on the inertial measurement data received from an inertial measurement unit measuring inertial motion of the mobile object.

11. The method of claim 9, wherein a first subset of the plurality of satellites belong to a first global navigation satellite system constellation;
wherein a second subset of the plurality of satellites belong to a second global navigation satellite system constellation; and
wherein the satellite signals received from the plurality of satellites are from both the first subset and the second subset of the plurality of satellites.

12. The method of claim 9, wherein at least one block of ground receivers of the plurality of blocks of ground receivers includes only one ground receiver.

13. The method of claim 9, wherein corresponding separation limits corresponding to at least two of the first separations and the second separations are different.

14. The method of claim 9, wherein the mobile object is an aircraft.

15. A navigation system, comprising:
a first receiver configured for reception of a plurality of satellite signals;
a second receiver configured for reception of differential correction data for a plurality of blocks of stationary receivers that are also receiving the plurality of satellite signals;
at least one processing device communicatively coupled to the first receiver and the second receiver;
wherein the at least one processing device is configured to determine correction data for each of the plurality of satellite signals based on the differential correction data received through the second receiver from the plurality of blocks of stationary receivers;
wherein the at least one processing device is configured to determine a position solution for the vehicle using each of the plurality of satellite signals received through the first receiver and corresponding correction data received through the second receiver from the plurality of blocks of stationary receivers;
wherein the at least one processing device is configured to determine a first plurality of position sub-solutions for the navigation system using a first plurality of subsets of the plurality of satellite signals and corresponding correction data, wherein each of the first plurality of subsets of the plurality of satellite signals includes signals from all but one single satellite, the one single satellite different for each of the first plurality of subsets of the plurality of satellite signals;
wherein the at least one processing device is configured to calculate first separations as a function of first differences between the position solution and the first plurality of position sub-solutions, the first separations providing first indications of any faults degrading the accuracy of the position solution;
wherein the at least one processing device is configured to determine a second plurality of position sub-solutions for the navigation system using each of the plurality of satellite signals and corresponding correction data received from a second plurality of subsets of the plurality of blocks of stationary receivers, wherein each of the second plurality of subsets of the plurality of blocks of stationary receivers includes all but one block of stationary receivers, the one block of stationary receivers excluded being different for each of the second plurality of subsets of the plurality of blocks of stationary receivers;
wherein the at least one processing device is configured to calculate second separations as a function of second differences between the position solution and the second plurality of position sub-solutions, the second separations providing second indications of any faults degrading the accuracy of the position solution; and
wherein the at least one processing device is configured to detect an error in the position solution when at least one of the first separations or the second separations exceed a corresponding separation limit.

16. The navigation system of claim 15, further comprising an inertial measurement unit communicatively coupled to the at least one processing unit;
wherein the inertial measurement unit is configured to measure inertial motion of the mobile object and supply inertial measurement data based on the measured inertial motion to the at least one processing unit; and
wherein the at least one processing unit is further configured to augment at least one of the position solution, the first position sub-solutions, and the second position sub-solutions based on the inertial measurement data received from the inertial measurement unit.

17. The navigation system of claim 15, wherein a first subset of the plurality of satellites belong to a first global navigation satellite system constellation;
wherein a second subset of the plurality of satellites belong to a second global navigation satellite system constellation; and
wherein the satellite signals received by the first receiver are from both the first subset and the second subset of the plurality of satellites.

18. The navigation system of claim 15, wherein at least one block of ground receivers of the plurality of blocks of ground receivers includes only one ground receiver.

19. The navigation system of claim 15, wherein corresponding separation limits corresponding to at least two of the first separations and the second separations are different.

20. The navigation system of claim 15, wherein the mobile object is an aircraft.

* * * * *